United States Patent [19]

Covill

[11] 3,845,392

[45] Oct. 29, 1974

[54] BEACON TRANSMITTER

[75] Inventor: Dennis H. Covill, Hackett's Cove, Canada

[73] Assignee: Nautical Electronics Laboratories Limited, Nova Scotia, Canada

[22] Filed: Nov. 21, 1973

[21] Appl. No.: 417,883

Related U.S. Application Data

[63] Continuation-in-part of Ser. No. 148,656, June 1, 1971, abandoned.

[52] U.S. Cl. .................... 325/158, 325/184, 330/84, 330/119, 330/122, 330/124 R

[51] Int. Cl. .................................... H04b 1/04

[58] Field of Search ........... 325/156, 157, 158, 184; 330/30 R, 55, 80, 84, 119, 120, 122, 124 R, 124 D

[56] References Cited

UNITED STATES PATENTS

| | | | |
|---|---|---|---|
| 1,801,870 | 4/1931 | Little | 325/157 |
| 3,202,940 | 8/1965 | Dietrich | 325/184 |

OTHER PUBLICATIONS

J. R. Hall, Transmitter Combiner, Communications, March, 1970, pp. 30–34.

*Primary Examiner*—Albert J. Mayer

[57] ABSTRACT

A radio transmitter system which utilizes solid state modular power amplifier branches connected in parallel. The amplifier branches are fed from an exciting stage via a splitter-isolator network. The outputs of the amplifier branches can be connected to a single antenna system via an isolating combining network which isolates each amplifier branch from the effects of the operating conditions of every other amplifier branch. The amplifier branches are wide band and have inherently stable phase characteristics. This wide band stable phase characteristic is obtained because each branch is designed to have the response of a low-pass filter having a cut-off frequency which is above the frequency range of the transmitter.

5 Claims, 8 Drawing Figures

BEACON TRANSMITTER

CROSS REFERENCE

The present application is a continuation in part application of Copending U.S. Pat. application Ser. No. 148,656, which was filed on June 1, 1971 now abandoned.

GENERAL BACKGROUND DESCRIPTION AND OBJECTS OF THE INVENTION

This invention relates to a radio transmitting system and particularly to a system suitable for transmitting navigational aid signals, commercially known as a Beacon Transmitter.

For obvious reasons, it is an important requirement in constructing such a transmitter system that the reliability of the transmitted signal be high. It is a second requirement that in the event of a signal failure or a signal degradation, the system be returned to full operating power as soon as possible.

It is an object of the present invention to provide a completely solid state transmitting system operating at relatively high power.

It is a further object of the present invention to provide a transmitting system having a high degree of transmitting reliability.

It is yet another object of the present invention to provide a transmitting system having a progressive power reduction with power amplifier failure, rather than a total failure with power amplifier failure.

With the advent of solid state devices, the reliability of circuit operation over long periods of time has been greatly improved. Unfortunately, the use of solid state devices has been relegated to relatively low power applications.

Redundancy is another design technique for improving equipment reliability. The present invention utilizes the principles of redundancy by providing a plurality of parallel amplifier branches, whose outputs are coupled together by a combining network which isolates the operating conditions of each branch from every other branch. As a result, if any one of these amplifier branches fail, total shutdown of the transmitter does not occur, but rather power output is reduced by a fraction which is proportional to the contribution of the failed amplifier branch. However, the coupling of such amplifier braches in a parallel configuration presents certain design problems the solution of which are provided by the present invention.

The parallel amplifier branches are provided as modular units, which fascilitates replacement and repair, thus enabling the rapid recovery of full operating power as soon as possible following the detection of a failure.

One embodiment of the present invention to be discussed in detail below employs solid state electronic circuits and operates at a power of 1,000 watts. There is in fact, no limit on the power handling capabilities of a transmitter according to the present invention imposed by its solid state circuitry.

The invention is thus seen to consist in replacing the normal power amplifying stage of a transmitter with a plurality of amplifier branches using solid state components, connected in a parallel arrangement, with each amplifier branch handling only a fraction of the power of the overall transmitting system.

Several problems arise when a plurality of amplifier branches are connected so that they each amplify a portion of the same signal and then combine their outputs to form a signal of relatively high power. One of the problems is assuring that the phase change of each amplifier branch be controlled so that its phase change is the same as the phase change through all other amplifier branches. If this criterion is not met, the signal outputs of each amplifier branch will not combine properly to provide a single undistorted high power signal.

One method of effecting phase correction is described in U.S. Pat. No. 2,840,696, which issued on June 24, 1958, to A. C. Beck et al. The system described by Beck and shown in FIG. 1 of his patent, requires that a descriminator 19 be used in a feedback circuit with phase adjusters 2 or 9 which adjust the phase change in any one of the power amplifying branches so that the signals add constructively.

In addition, prior art systems which attempt to couple a plurality of parallel amplifier branches employ the use of relatively narrow band resonant circuits, particularly in their coupling circuits. Resonant circuits, in particular highly tuned resonant circuits, have an inherent instability especially over long periods of time. The aging of components and changes in environmental conditions tend to change the frequency point or resonant point at which the circuits operate. As the resonant point shifts the amount of power at the original resonant point that the circuit can transfer is reduced. In addition, the phase characteristics of such circuits change drastically as the resonant frequency shifts.

Both a decreasing power output and a shift in phase inherent in detuned resonant circuits could not be tolerated in a Beacon Transmitter according to the present invention because any reliability gained by using redundancy techniques would be off-set by the inherent lack of stability of tuned circuits. The solution to the problem was not merely the elimination of phase correcting circuitry but the elimination of any need for such circuitry.

The present invention eliminates problems associated with tuned circuit stages and phase adjusting circuitry by providing an amplifier branch which exhibits the characteristics of a low-pass filter which has a cutoff frequency above the usable frequency range of the transmitter. Such a configuration has a constant amplitude gain over an extremely wide band and, in addition exhibits a stable, predictable and reproducable phase response over this band. Such an amplifier has no points of resonance within the usable frequency range of the transmitter and this results in the aforementioned gain and phase response.

The use of amplifier branches such as this also results in a very great economic advantage. Each Beacon Transmitter, when used as a navigational aid, is assigned some specific frequency within the operating band. Since the amplifier branches are all wide band and since each has a substantially identical phase characteristic, there is no need to tune each transmitter amplifier unit at its assigned frequency. In order to operate the transmitter at any frequency within the band of interest, the correct exciter need only be plugged in. This, of course, fascilitates the installation of a transmitter and eliminates any need to custom build each transmitter at its assigned frequency.

As a result of the wide band stable phase characteristics of each amplifier branch a plurality of branches can be connected in parallel with a splitter-isolator feeding each branch and an isolator combiner summing each output to produce a constructive, "in phase" addition of the amplified signal from the output of each amplifier branch. This constructive addition of the signal from each amplifier branch is accomplished without the use of phase adjusting equipment of any sort.

A second problem which arises when employing a plurality of power amplifier branches to derive a single high power source of radio energy, is the interaction of the various branches on one another. This problem becomes more important when overall high transmission reliability is required, as in transmitters supplying navigational information. It becomes imperative that the failure of one amplifier branch not effect the operation of any of the other amplifier branches even in the extreme case when one branch presents an open or short circuit condition at its output. U.S. Pat. No. 2,840,696 overcomes this problem by employing one antenna for each amplifier branch. That system makes difficult the radiation of omnidirectional patterns. The transmitter according to the present invention employs an isolating hybrid combining system which combines the output of each amplifier branch into a single high power signal. The isolating hybrid combiner isolates each amplifier branch from every other branch so that even if one or more branches have short circuited outputs, the remaining branches continue to function and the transmitted RF power of the system is only fractionally reduced. The fractional reduction in the radiating power is proportional to the power of amplifier branches which are non-operative.

In order to further improve the reliability of transmitting systems, according to the present invention, each amplifier branch has associated with it a separate power supply. In the event of a single power supply failure, the overall systems power output would only be reduced by a fractional amount, comparable to the failure of one amplifier branch.

Since reliability is of primary importance in the transmitter system according to the present invention it is important that the failure of the input circuitry of an amplifier branch not load down the source of RF or the remaining branch inputs. As a result, even though a dividing means is included within the scope of the present invention, it is preferable to connect the source of RF to the various inputs to the amplifier branches via a splitter-isolator. In one particular embodiment, the RF exciter has a relatively low impedance output and each branch is fed via a relatively high value series resistance. With this configuration, even if the input of a particular branch fails by short circuiting, it would be equivalent to placing a relatively high resistance in parallel across the RF source output, which would not load that source to any great extent.

In accordance with the present invention there is provided a radio transmitter comprising a low power radio frequency source; a splitter-isolator means having a plurality of outputs and one input, said input being connected to said source; a plurality of amplifier branches each having an input and an output, each input being connected to one output of said splitter-isolator means in a 1-to-1 correspondence whereby each of said branches amplifies said signal; a combiner means having inputs each connected to one output of said amplifier branch in a 1-to-1 correspondence and providing an output which is the sum of the amplifier branch outputs and an antenna means fed by the output of said combiner, said combiner and antenna forming a constant load, each amplifier branch being characterised in that it includes a power amplifier stage, said power amplifier stage having an input and an output and at least one transistor, said transistor having a grounded base electrode, the amplifier stage input being connected to the emitter of said transistor via a matching transformer and an emitter-swamping resistor; the collector of said transistor being connected to said load via a transformer; said transformer having a leakage inductance such that when taken with the collector capacitance of said transistor and the resistance of said load, exhibits the response of a low-pass filter having a cutoff frequency above the usable frequency range of the transmitter.

SUMMARY OF THE DRAWINGS

These and other features and objects will be described in detail with the aid of the accompanying drawings in which.

DETAILED DESCRIPTION

Figure 1:
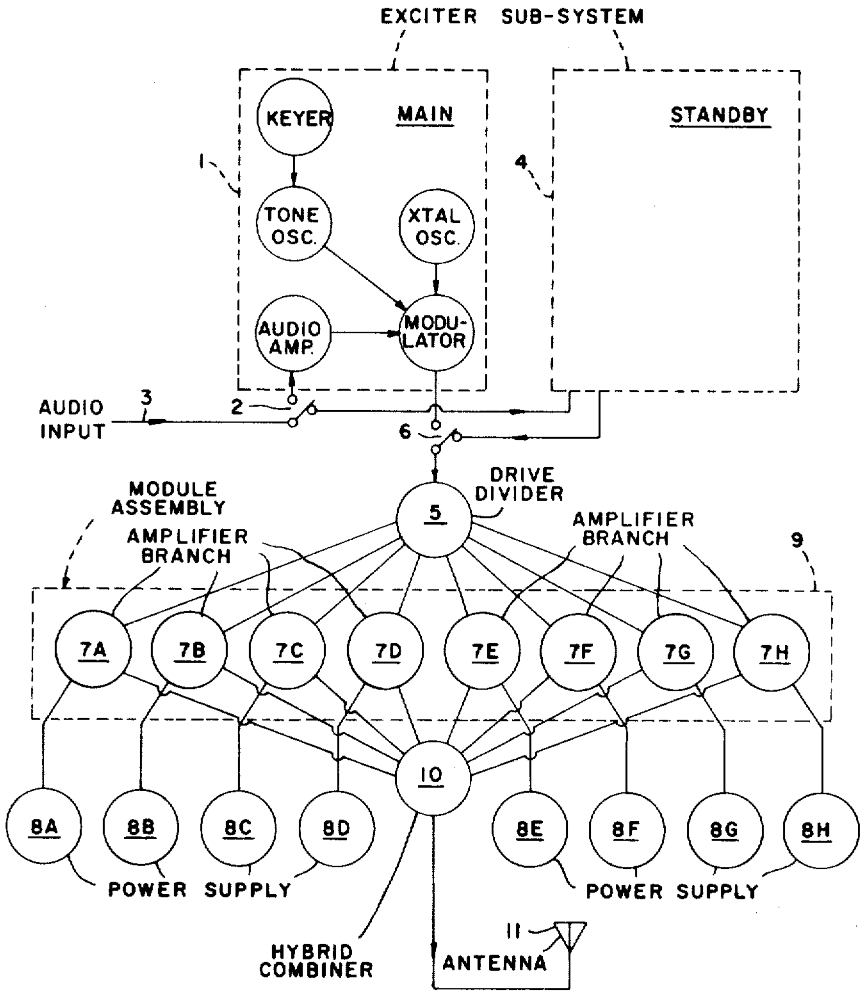
FIG. 1 is a block diagram of a transmitter according to the present invention.

With reference to FIG. 1, an exciter 1 represents the main source of RF low power signal and may be constructed in accordance with conventional design techniques, preferably using solid state components. Exciter 1 produces at its output an appropriate modulated single side band signal. There is provision for the external audio modulation of the RF signal via line 3 and switch 2. A second standby exciter system 4, is provided which can either automatically be switched (by means not shown) or as shown, manually switched to a splitter-isolator 5 by a switch 6 in the event of failure or degradation of the signal emanating from the main exciter 1. The splitter-isolator 5 divides the output signal of the exciter equally into eight separate signals in such a manner that all eight signals are identical with respect to amplitude and phase.

The eight separate and equal signals emanating from the splitter-isolator are respectively fed to amplifier branches 7A through 7H of an amplifier branch module assembly 9. In this particular embodiment, the amplifier branch module assembly consists of eight amplifier branches, but it should be understood that a transmitter according to the present invention can be constructed using any number of amplifier branches. Each amplifier branch, 7A for example, consists of a broad band amplifier having a response characteristic of a low-pass filter which has a cut off frequency above the usable frequency range of the transmitter, thereby yielding a well defined and stable amplitude and phase characteristic. Each amplifier branch is preferably constructed using solid state components. A suitable amplifier branch will be described in detail with respect to FIG. 2.

Associated with and supplying electrical energy to each amplifier branch 7A through 7H are eight solid state power supplies 8A through 8H. Since eight separate amplifier branches are provided and each amplifier branch is dependent on only a single power supply, the failure of any one amplifier branch or power supply or even more than one such unit only fractionally reduces the overall radiating power of the transmitting system.

An isolating hybrid combiner 10 receives the output of each of the amplifier branches and combines these outputs as a single relatively high powered signal which is fed to an antenna system 11. The signal out-puts of the amplifier branches 7A through 7H have a substantially identical phase relationship with each other since they originate from the same signal source and pass through amplifier branches having the same phase characteristics. Therefore, their outputs add constructively in the isolating hybrid combiner 10. In addition to combining the eight amplifier branch outputs, the isolating hybrid combiner isolates the outputs of each amplifier branch from the output of each other amplifier branch. This feature allows the overall system to remain operational at a reduced power even if one or more amplifier branches fail with short circuited outputs. The operation of a suitable combiner will be described in detail with reference to FIGS. 7 and 8.

Figure 5:
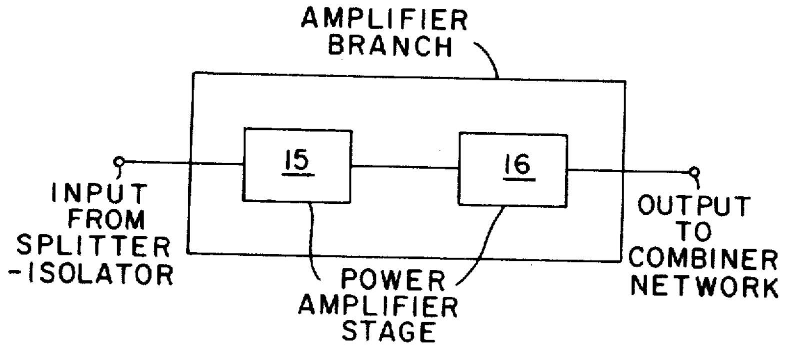
FIG. 5 is a block diagram of a particular amplifier branch showing two power amplifier stages connected in cascade.

FIG. 5 shows a diagramatic example of one possible amplifier branch. The amplifier branch shown in FIG. 5 employs two power amplifier stages connected in cascade. The invention contemplates the use of at least one power amplifier stage in any one amplifier branch. The basic AC configuration of each power amplifier stage is identical.

Figure 2:
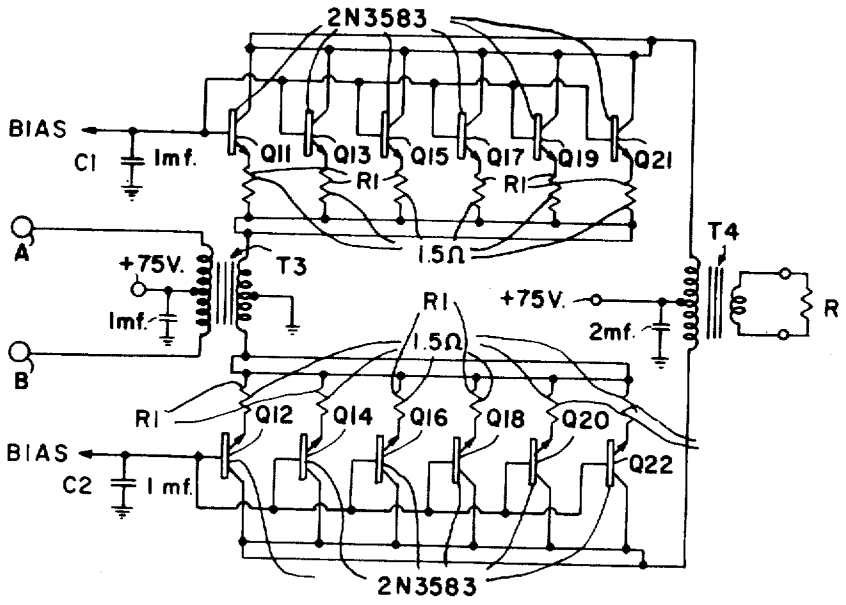
FIG. 2 is a schematic diagram of an embodiment of an amplifier branch according to the invention.

One such power amplifier stage is shown in FIG. 2.

The power amplifier stage shown in FIG. 2 is of the class B type. However, the invention encompasses class A operation as well. The power amplifier stage is of the grounded base type. FIG. 2 shows the base electrode of transistors Q11, Q13, Q15, Q17, Q19 and Q21 connected to ground via capacitor C1. Similarly, the base electrodes of transistors Q12, Q14, Q16, Q18, Q20 and Q22 are all connected to ground via capacitor C2. It should be understood that when it is said that the base electrode is grounded, what is meant is that it is grounded with respect to the AC signal. In fact, DC bias for the transistors shown in FIG. 2 is supplied by two lines marked "BIAS." The RF signal is fed into the amplifier stage at terminals A and B. The RF signal is fed to the emitter electrodes of all the transistors via a matching transformer T3 and individual emitter swamping resistors R1. The collectors of all the transistors Q11 to Q22 are connected to the load R via a transformer T4. The transistors Q11, Q13, Q15, Q17, Q19 and Q21 may be idealized into a single transistor. Similarly, transistors Q12, Q14, Q16, Q18, Q20 and Q22 may be idealized into a single transistor. Indeed, the only reason for having a plurality of transistors in each arm of the class B configuration is limitations in the present state of the art in transistor design. The present invention contemplates any number of transistors connected in a parallel configuration in each arm of the class B arrangement. The power gain of the power amplifier stage shown in FIG. 2 can be calculated by considering FIG. 3.

Figure 3:
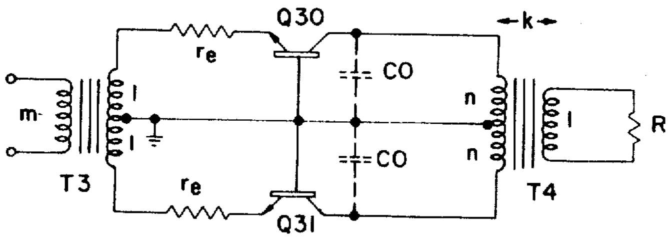
FIG. 3 is a schematic diagram of an equivalent AC circuit of the schematic shown in FIG. 2.

FIG. 3 is an equivalent circuit of the arrangement shown in FIG. 2. Q30 represents all of the transistors appearing in one arm of the class B configuration and Q31 represents all of the transistors appearing in the other arm of the class B configuration. The capacities CO shown in phantom in FIG. 3 represent the collector-base interelectrode capacities of the transistors Q30 and Q31. The value of the load R depends on where the power amplifier stage appears in the amplifier branch. For example, if the power amplifier stage in question is power amplifier stage 16 shown in FIG. 5, the load R will be the combiner network and the antenna. If, on the other hand, the power amplifier stage in question is power amplifier stage 15 shown in FIG. 5, the load in the input impedance of the power amplifier stage 16.

The matching transformer, because the stage under consideration is class B, is a balanced transformer and it's winding ratio is defined as m:1. Similarly, transformer T4 has a ratio of 1:n.

Assuming that a sinusoidal RF signal is applied to the input terminals A and B of the circuit shown in FIG. 2, the peak current appearing across the load R when the transitor Q30 is conducting will be $+n$ ic1 where ic1 is the peak collector current of transistor Q30. Similarly, when Q31 is conducting the peak current appearing across R will be $-n$ ic2 where ic2 is the peak collector current for transistor Q31. Since the push pull class B configuration is balanced $n$ ic1 $= n$ ic2 and so, a sinusoidal current will appear across the load R whose peak value is $n$ ic1 and whose RMS value is 0.707 n ic1. As a result, the power in R will be $n^2\ ic1^2\ R/2$. If the peak value of the voltage appearing at terminals A and B of FIG. 2 is assumed to be $V_{in}$ and the transistors are assumed to be ideal, the input power can be calculated. The input voltage appearing at the input of the secondary side of the transformer T3 for each arm will be $V_{in}/m$. Since the transistors are ideal $ic2 = ic1 = V_{in}/(m\ r_e)$. The RMS value of the input voltage will be $0.707V_{in}\ /m$. and the power at the input will be $V^2_{in}/(2m^2\ r_e)$. Since $V_{in}^2 = ic1^2\ m^2\ r_e^2$, the power at the input as a function of the current ic1 is $ic1^2 r_e/2$. The power gain can then be calculated as being the power in the load R divided by the input power and is found to be $n^2R/r_e$.

Figure 4:
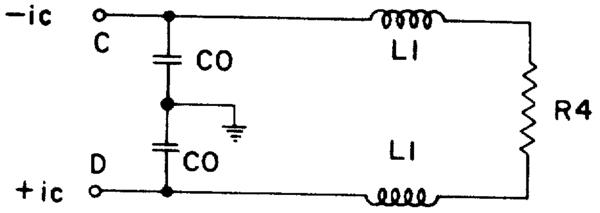
FIG. 4 is a schematic diagram of a second equivalent circuit of the schematic shown in FIG. 2 showing the low-pass equivalent circuit configuration.

FIG. 4 is a further equivalent circuit of the circuit shown in FIG. 3. FIG. 4 shows how the power amplifier stage according to the present invention can be considered as a low-pass filter. The primary winding inductance of the transformer T4 shown in FIGS. 2 and 3 can be defined as $L_p$, then if the coupling coefficient of the transformer is defined as $k$ the leakage inductance of the transformer will be $(1 - k^2)L_p$. Inductances L1 and L2 in FIG. 4 will each have a value of $(1 - k^2)L_p/2$, since a balanced push pull circuit is being considered.

The load R shown in FIG. 3 can be transformed back through the transformer and appears as R4 in FIG. 4. Its value will be $4n^2R$. As mentioned above, both transistors Q30 and Q31 in FIG. 3 have collector-base interelectrode capacities CO. If a current −ic and +ic is fed into terminals C and D of the circuit shown in FIG. 4 it can be seen that a balanced low-pass filter results. The capacitance CO and the resistance R of the load are both known values. As a result, it is possible to choose the coupling coefficient $k$ of the transformer T4 such that the combination of the leakage inductance $L_L$, the capacitance CO and the resistance R yields a low-pass filter which has a cut-off frequency which is above the usable range of the transmitter.

Figure 6:
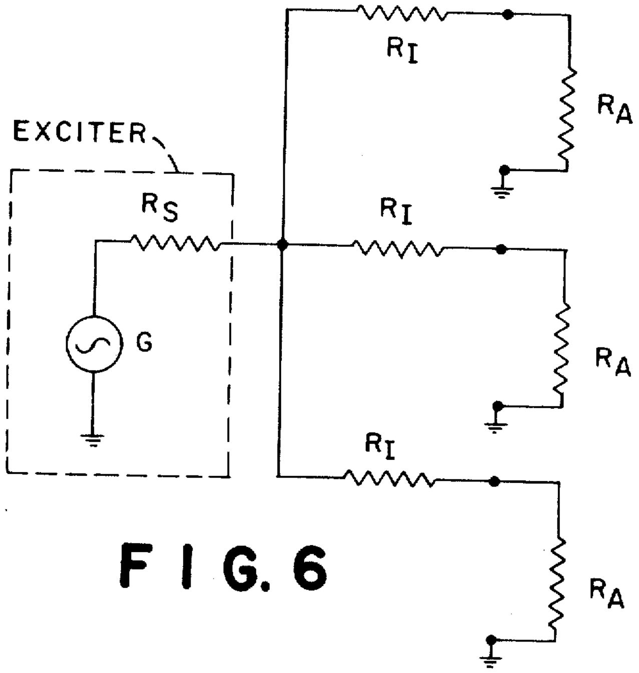
FIG. 6 is a schematic diagram of a particular embodiment of a splitter-isolator which could be used in the transmitter according to FIG. 1.

As mentioned above, it is preferable that the operating conditions at the input of an amplifier branch not affect the operating conditions of any other amplifier branch so as to stop that other branch from operating. As a result, it is preferable to employ a splitter-isolator network for feeding the RF signal from the exciter to the amplifier branches. One such splitter-isolator is shown in FIG. 6. The RF exciter is shown in FIG. 6 as the series connection of a generator G and a source resistance $R_S$. The value of the source resitance is arranged to be as low as possible. The input resistance of each amplifier branch is shown in FIG. 6 as resistor $R_A$. In FIG. 6, three amplifier branches are shown connected to the exciter. A resistor $R_I$ connects the exciter to each amplifier branch. The resistance of each divider resistor is chosen to be high with respect to the source resistance $R_S$. If a short circuit condition is present at the input of one of the amplifier branches the voltage at the common point of the splitter-isolator will not be affected to any great degree since the common point is not directly short circuited to ground.

Figure 7:
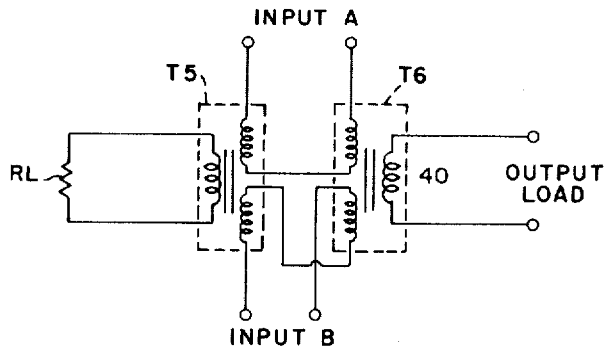
FIG. 7 is a schematic diagram of a single hybrid combiner which may be used in one embodiment of a transmitter system according to the present invention.

FIG. 7 is a schematic diagram of a suitable isolating hybrid network capable of combining two of the amplifier branches into a single output. FIG. 7, is a schematic diagram of a ring hybrid unit and is a general class of network having four ports, two input ports and two output ports. A signal at one input port does not appear at the other input port. As a result, the two input ports are mutually isolated. However, the single input signal does appear equally at both output ports. When signals are introduced into both input ports, a signal corresponding to the sum of the two input signals appears at one of the output ports 40 in FIG. 7, and a signal equal to the difference between the two input signals appears at the other output port and is disipated in the resistance RL which is selected to match the output impedance. According to the present invention, both input signals are substantially identical in both phase and amplitude and therefore the difference of the two signals will be approximately zero.

Accordingly, FIG. 7 shows an isolating hybrid network consisting of two radio frequency transformers T5 and T6. When input A and input B are supplied with equal signals, the sum of both signals is transferred to the output load and the difference (in general, zero) between the two input ports appears across the dummy load RL. If, however, either input A or input B is removed, then the output power will be distributed equally between the output and the resistor RL, yielding a net 6 db reduction in the desired output. Under this condition, the system is not affected by the termination impedance at the zero signal input port, and even if a short circuit condition develops it will be of no consequence.

Figure 8:
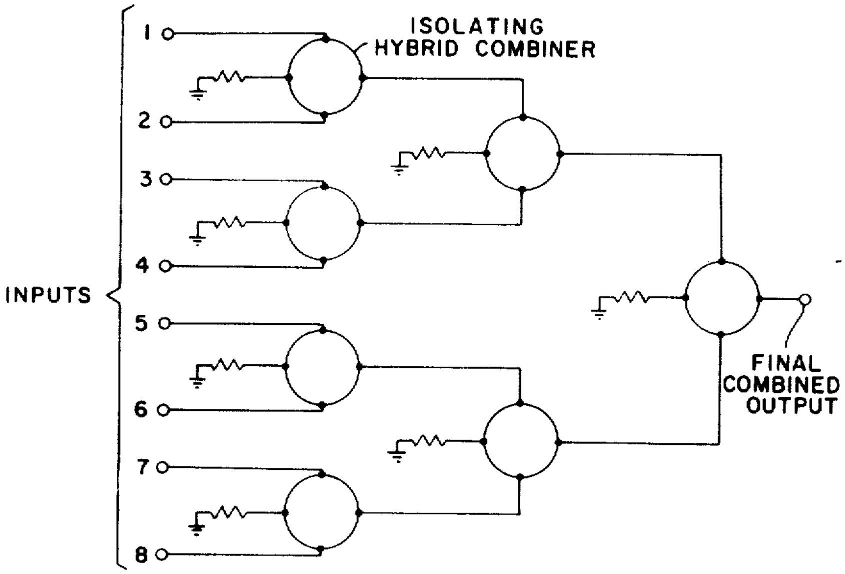
FIG. 8 is a block diagram of the hybrid combining system which may be employed in the transmitter according to FIG. 1.

FIG. 8 shows how seven hybrid networks of the type shown in FIG. 7 can be connected to combine the eight outputs of the amplifier branches into a single high power output which in turn feeds the antenna network 11 shown in FIG. 1.

As mentioned above, any number of amplifier branches can be combined in isolating hybrid combiners of the above mentioned type to yield a single high power signal, but the most convenient system utilizes $2^n$ power amplifier branches where $n$ is an integer. Such a system feeds equal amplitude signals to the input ports of all combiners. However, systems which feed unequal amplitude signals to one or more of the isolating hybrid combiners may be realized and these unequal signals may be successfully combined to yield good isolation and approximately no output at the dummy load port of the combiner in question by varying the turns ratio of transformers T5 and T6 shown in FIG. 7. Although the amplifier branches may feed output signals of different amplitudes into the combining network shown in FIG. 8 it is necessary that the phase relationship between all of the outputs of the amplifier branches be identical.

What I claim as my invention is:

1. A radio transmitter comprising a low power radio frequency source; a splitter-isolator means having a plurality of outputs and one input, said input being connected to said source; a plurality of amplifier branches each having an input and an output, each input being connected to one output of said splitter-isolator means in a 1-to-1 correspondence whereby each of said branches amplify said signal; a combiner means having inputs each connected to one output of said amplifier branch in a 1-to-1 correspondence and providing an output which is the sum of the amplifier branch outputs and an antenna means fed by the output of said combiner means, said combiner means and antenna forming a constant load, each amplifier branch being characterized in that it includes a power amplifier stage, said power amplifier stage having an input and an output and at least one transistor, said transistor having a grounded base electrode, the power amplifier stage input being connected to the emitter of said transistor via a matching transformer and an emitter-swamping resistor; the collector of said transistor being connected to said load via a transformer; said transformer having a leakage inductance such that when taken with the collector capacitance of said transistor and the resistance of said load, exhibits the response of a low-pass filter having a cut-off frequency above the usable frequency range of the transmitter.

2. A transmitter according to claim 1 wherein each amplifier branch further includes at least one additional power amplifier stage connected in cascade with the first mentioned power amplifier stage, said additional power amplifier stage having an input and an output and including at least one transistor having a grounded base electrode; the input of said additional stage being connected to the emitter of said transistor via an emitter-swamping resistor, the collector of said transistor being connected to a load via a transformer, the load being the input impedance of the succeeding power amplifier stage, the leakage inductance of said transformer being such that when taken with the collector capacitance of said transistor and the resistance of said load, exhibits the response of a low-pass filter having a cut-off frequency above the usable range of said transmitter.

3. A radio transmitter according to claim 1 wherein said combiner means is an isolating hybrid combining network arranged so that the output of each of said amplifier branches is mutually isolated.

4. A radio transmitter according to claim 3 additionally comprising a plurality of power supplies connected in a 1-to-1 correspondence with each of said amplifier branches, each of said power supplies supplying electrical energy to an associated one of said amplifier branches.

5. A transmitter according to claim 1 wherein said splitter-isolator is comprised of a plurality of resistors, said resitors all being connected at one end to a common point, said common point being connected to said RF signal source, the other end of each resistor being connected to a corresponding input of each amplifier branch in a 1-to-1 correspondence, said RF source having a source resistance and each of said amplifier branches having an input resistance wherein the resistance of each of said plurality of resistors is greater than the source resistance or the input resistance to thereby mutually isolate the input of each amplifier branch.

* * * * *